UNITED STATES PATENT OFFICE.

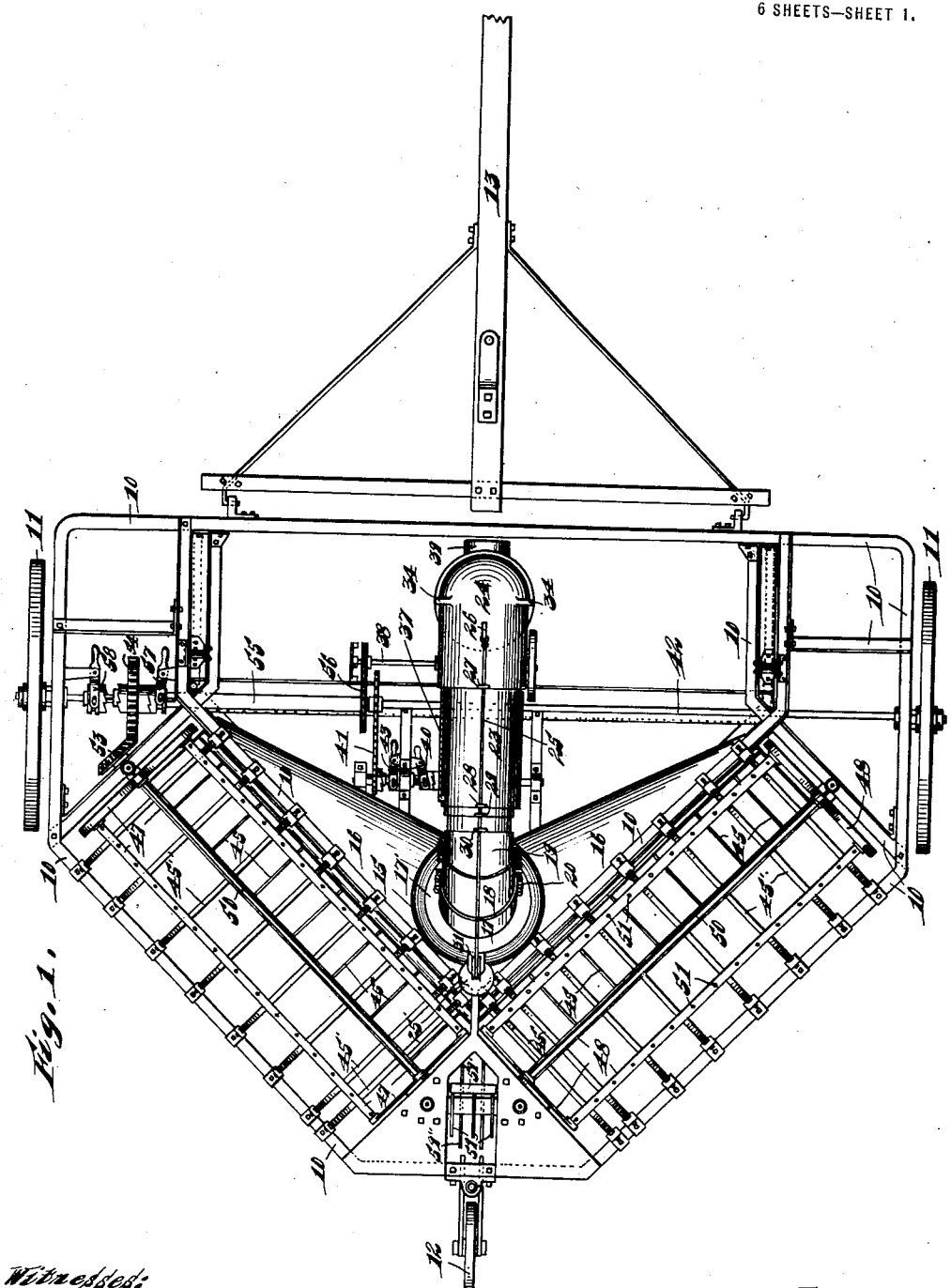

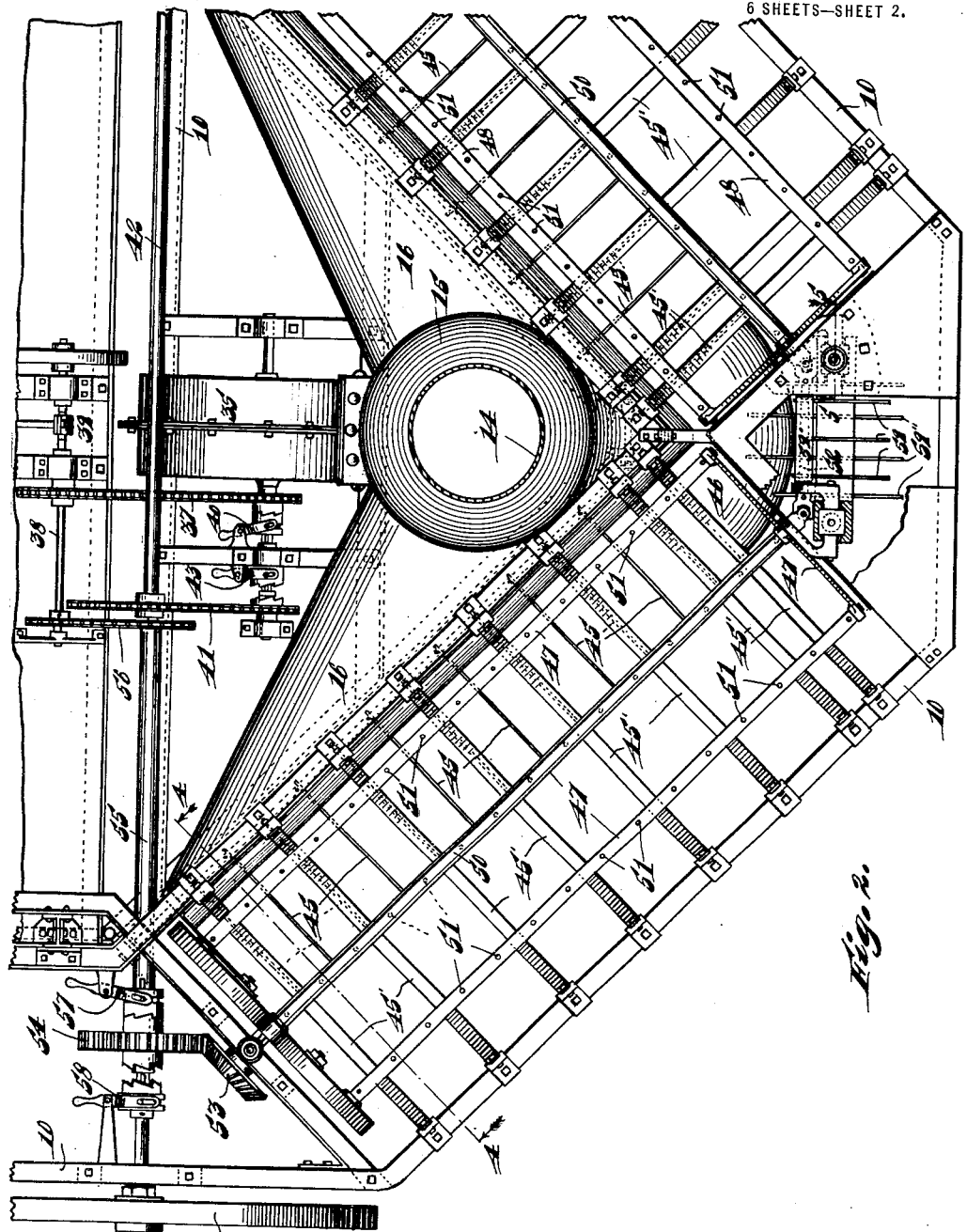

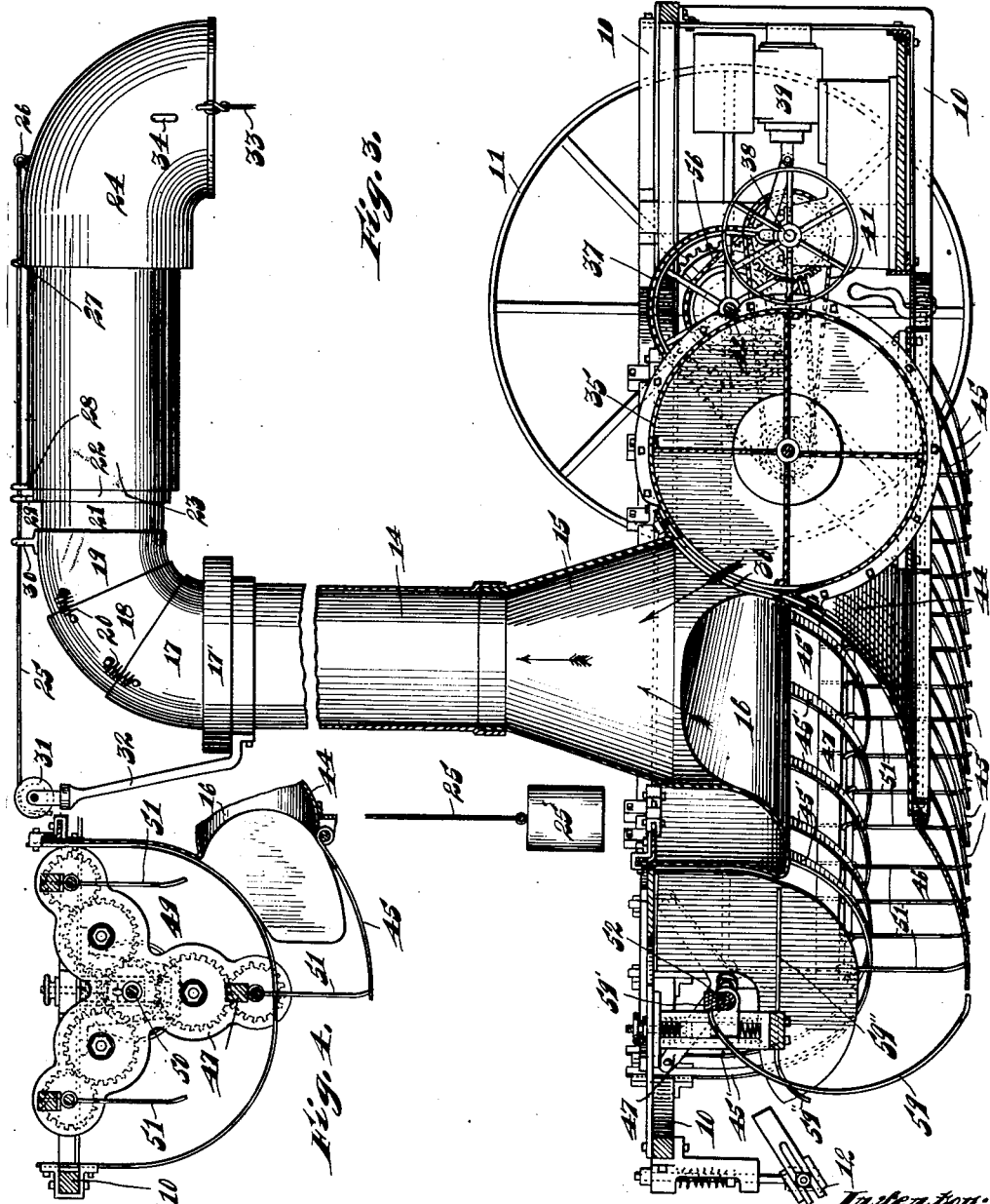

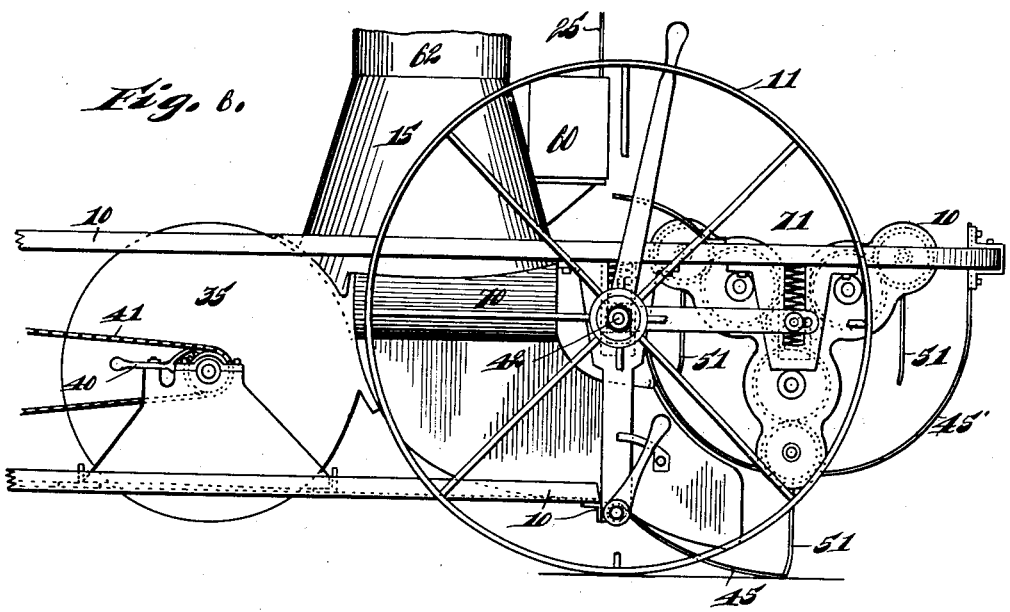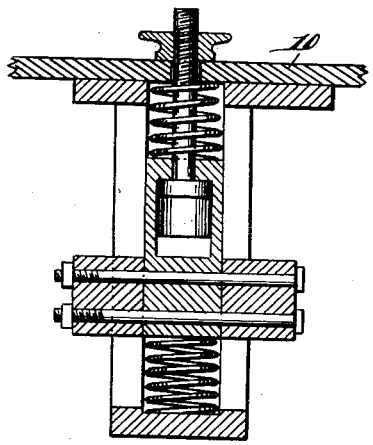

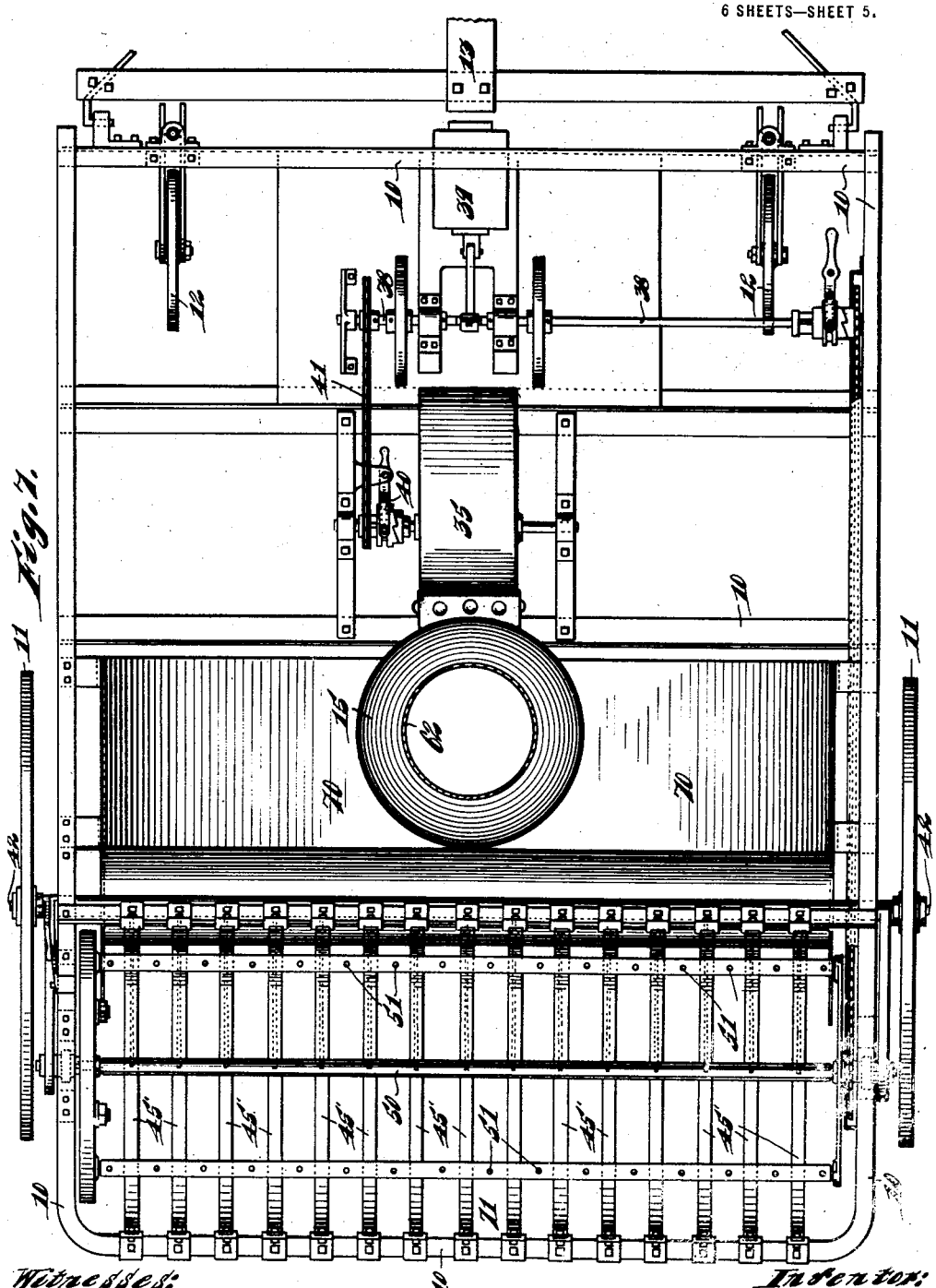

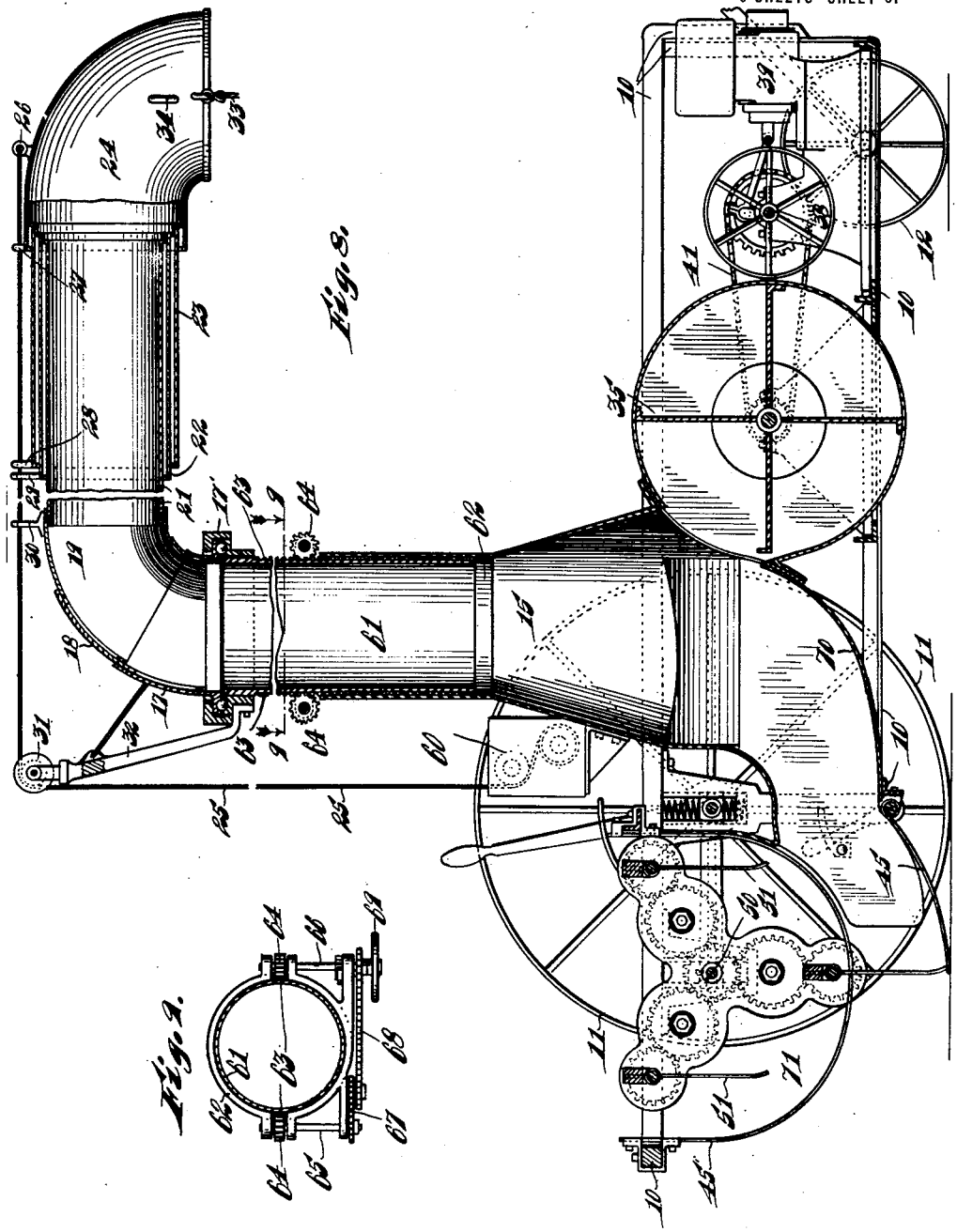

NICHOLAS M. BOWERS, OF WEST McHENRY, ILLINOIS.

HAY-LOADER.

1,336,065.  Specification of Letters Patent.  Patented Apr. 6, 1920.

Application filed September 24, 1915. Serial No. 52,439.

*To all whom it may concern:*

Be it known that I, NICHOLAS M. BOWERS, a citizen of the United States, and a resident of West McHenry, county of McHenry, and State of Illinois, have invented certain new and useful Improvements in Hay-Loaders, of which the following is a specification.

My invention relates to improvements in hay loaders and has for its object the provision of an improved construction of this character by means of which hay may be gathered from a field and distributed uniformly over a hay wagon.

Other objects will appear hereinafter.

The invention consists in the combinations and arrangements of parts hereinafter described and claimed.

The invention will be best understood by reference to the accompanying drawings forming a part of this specification, and in which, Figure 1 is a top plan view of a hay loader embodying my invention, Fig. 2, an enlarged top plan view of a portion of the rear portion of said hay loader, Fig. 3, a vertical central longitudinal section taken through the construction, parts being shown in elevation, Fig. 4, a section taken on line 4—4 of Fig. 2, Fig. 5, an enlarged section taken on line 5—5 of Fig. 2, Fig. 6, a side elevation of a modified form of construction, Fig. 7, a top plan view of the construction illustrated in Fig. 6, Fig. 8, a vertical section of the construction illustrated in Fig. 7, and Fig. 9, a section taken on line 9—9 of Fig. 8.

The preferred form of construction, as illustrated in the drawings, comprises a wheeled frame 10 having traction wheels 11 and 12 and a tongue 13 at the front by means of which said frame may be attached to the rear of an ordinary hay wagon. A vertical pipe 14 is positioned centrally on the frame 10 and communicates at its lower end with a conical enlargement or base 15 communicating in turn with a hood 16 in substantially V-form, as indicated. Telescoping elbow pipe sections 17, 18 and 19 are swiveled to the upper end of pipe 14 by means of a swivel joint 17', said elbow pipe sections being normally held in retracted positions by means of springs 20. Horizontally extending telescoping pipe sections 21, 22 and 23 are connected with elbow section 19, as indicated and a downwardly opening elbow pipe section 24 is connected with the free end of pipe section 23. A flexible cable 25 is connected with an eye 26 on elbow section 24 and is passed through eyes 27, 28, 29 and 30 on the pipe sections, over a pulley 31 swiveled on a bracket 32 and connected with a weight 25', said weight thus serving to support and normally hold the telescoped pipe sections in retracted position but permit of their ready extension. A rope or cable 33 is connected with elbow section 24 and handles 34 are provided on each side thereof to facilitate manual manipulations thereof including the extension and maintenance thereof in extended condition. By this arrangement, it will be observed, that the elbow section 24 may be adjustd manually to any position over a wagon to the rear end of which the frame of the machine is attached so as to cause a uniform distribution of hay fed therethrough.

A blower housing 35 is arranged immediately in front of hood 16 and communicates with the lower end of pipe base 15 through an opening 36 whereby an upwardly directed blast of air may be forced upwardly through pipe 14. The fan in housing 35 is driven by means of a sprocket chain 37 connected with an engine shaft 38 driven by an ordinary gasolene engine 39 mounted on frame 10, said sprocket chain 37 being thrown into and out of operative connection with said fan by means of a clutch mechanism 40, as shown in Fig. 2. Said fan may also be driven by means of a sprocket chain 41 connected with the axle 42 of the wheels 11, being thrown into and out of operative connection with said fan by means of a clutch mechanism 43. By this arrangement, it will be observed, that the fan may be driven either by the engine 39 or the axle of wheels 11 and in either event will direct a strong upward blast of air through the pipe sections 15, 14, 17, 18, 19, etc., thus inducing a strong upward draft through the housing 16, as will be readily understood.

Hay directing aprons 44 are arranged immediately below housing 16 and substantially conforming in shape thereto, said aprons being provided with rearwardly and laterally extending pivoted tines 45 adapted to drag upon the ground. A central pivoted apron 46 is arranged between the sets of tines 45 also arranged to drag upon the ground. Raking frames 47 and 48 are positioned in frame 10 at the rear of housing 16 and ordinary side delivery rake mechanisms 49 are positioned in said frames, each of said rake mechanisms being driven by the usual central shaft 50 and tines 51 operating through U-shaped guards 45', as indicated. The specific raking mechanism referred to is an old and well known construction and no claim is made thereto specifically except in so far as the same coöperates with the other elements of the construction. The operation of this raking mechanism is well understood and requires no further description here. The shafts 50 of said raking mechanisms are connected together by a connecting shaft 52 having universal joint connections therewith, as best shown in Fig. 2, and said shafts are driven by means of a bevel gear 53 meshing with a pinion 54 on a loosely mounted sleeve 55 loosely mounted on axle 42 and driven by means of a sprocket chain 56 from engine shaft 38, a clutch mechanism 57 serving to throw said pinion into and out of operative connection with said sleeve. Another clutch mechanism 58 serves to operatively connect the pinion 54 with the axle 42 so that the raking mechanism may be driven either by means of the engine 39 or the wheels 11 of frame 10, as desired.

Raking tines 59 are secured to a cross bar 59' loosely mounted on shaft 52 between the raking mechanisms 49 in position to collect any hay missed by said raking mechanisms and deliver the same onto apron 46, and all of said raking mechanisms are provided with any usual or desired means of vertical adjustment so that they may be readily thrown into and out of operative relation with the ground when desired. Guards 59'' coöperate with tines 59 to prevent the hay from working upwardly. The arrangement is such that as the frame 10 traverses a field any hay thereon will be gathered by the raking mechanisms and delivered to apron 44 whence it will be drawn upwardly through the pipe sections by the induced draft and delivered onto the hay wagon through discharging elbow 24, which as explained above, may be readily adjusted to cause uniform distribution of the load over the hay wagon.

The modified form of construction illustrated in Figs. 6 to 9 inclusive, operates on the same general plan as that already described except that a different form of raking mechanism is employed. In this construction also the telescoping pipe sections are yieldingly held by means of the cable 25 leading into a casing 60, where it may be coiled on a spring drum or other suitable arrangement for taking up slack therein. The vertical pipe is also composed of two telescoping sections 61 and 62, section 61 being provided with rack bars 63 meshing with pinions 64 on shafts 65 and 66 connected by sprocket chains 67 and 68, the shaft 66 being provided with an operating handle 69 and by means of which the pipe section 61 may be vertically adjusted, as desired. The pipe section 15 communicates with a transverse hay receiving housing 70 and a transversely positioned raking mechanism 71 coöperates with said housing to deliver the hay thereto, as will be readily understood. Otherwise the two constructions are substantially the same and operate on the same principle so that further description is unnecessary.

While I have illustrated and described the preferred forms of construction for carrying my invention into effect, these are capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A hay loader comprising a vertically extending pipe; a horizontal extension to said pipe swiveled to the upper end thereof, said extension comprising a plurality of telescoped sections; means for inducing a draft of air through said pipe; and yielding means normally holding said sections contracted, substantially as described.

2. A hay loader comprising a vertically extending pipe; a horizontal extension to said pipe swiveled to the upper end thereof, said extension comprising a plurality of telescoped sections; means for inducing a draft of air through said pipe; raking means arranged to deliver hay to the lower end of said vertically extending pipe; and yielding means normally holding said sections contracted, substantially as described.

3. A hay loader comprising a wheeled frame; means for attaching said frame behind a hay wagon; a vertically positioned pipe on said frame; a plurality of spring held telescoping elbow pipe sections swiveled to the upper end of said pipe; a plurality of horizontally extending telescoped pipe sections connected with said elbow sections; a downwardly opening elbow section connected with the free ends of said horizontal sections; yieldable means for holding said pipe sections in retracted positions; a blower arranged to deliver an upward blast of air to the lower end of said vertical pipe; an internal combustion engine on said frame connected to operate said blower; and raking means on said frame arranged to deliver hay to the lower end of said pipe, substantially as described.

4. A hay loader comprising a wheeled frame; means for attaching said frame behind a hay wagon; a vertically positioned pipe on said frame; a plurality of spring held telescoping elbow pipe sections swiveled to the upper end of said pipe; a plurality of horizontally extending telescoped pipe sections connected with said elbow sections; a downwardly opening elbow section connected with the free ends of said horizontal sections; yieldable means for holding said pipe sections in retracted positions; a blower arranged to deliver an upward blast of air to the lower end of said vertical pipe; an internal combustion engine on said frame connected to operate said blower; raking means on said frame arranged to deliver hay to the lower end of said pipe; a driving connection between said engine and said wheeled frame; an operative connection between said engine and said raking mechanism; and operative connections between the wheels of said frame and said blower and raking mechanism, substantially as described.

5. A hay loader comprising a frame mounted upon wheels, a delivery pipe extending upwardly and forwardly, a hood on said frame in communication with said pipe, an outwardly and rearwardly extending apron beneath said hood, means for creating an upward draft through said pipe and means for depositing hay upon said apron, substantially as described.

6. A hay loader comprising a frame mounted upon wheels, an outwardly opening hood on said frame, a delivery pipe extending upwardly and forwardly from said hood, an apron extending downwardly and rearwardly beneath said hood, a plurality of tines pivotally connected to the lower edge of said apron, means for depositing hay upon said apron and tines and means for creating an upward draft through said pipe, substantially as described.

7. A hay loader comprising a frame mounted upon tractor wheels, a hood on said frame, a delivery pipe extending upwardly and forwardly from said hood, an apron beneath said hood, a motor, means for depositing hay upon said apron and selective means for driving the last mentioned means either from said motor or said tractor wheels, substantially as described.

8. A hay loader comprising a frame, the transverse shaft on said frame, tractor wheels on said shaft, a sleeve loosely mounted on said shaft, a motor, and operative connection between said motor and said sleeve, a hood and coöperating apron, a delivery pipe extending from said hood, means for delivering hay upon said apron and means for coupling the last said means selectively to said shaft or said sleeve, substantially as described.

9. A hay loader comprising a frame, an axle and wheels supporting the same, means for attaching said frame behind a hay wagon, an adjustable hay delivering member on said frame arranged to deliver to said wagon, a fan for inducing a draft of air through said member, means for operating said fan from said axle, and raking means on said frame to deliver hay to said delivery member, substantially as described.

In testimony whereof I have signed my name to this specification in the presence of two subscribing witnesses.

NICHOLAS M. BOWERS.

Witnesses:
   JOSEPH C. HOLLY,
   PERCY F. LODTZ.